United States Patent
Berti et al.

(10) Patent No.: US 7,488,774 B2
(45) Date of Patent: Feb. 10, 2009

(54) REACTOR SYSTEM FOR THE PRODUCTION OF HIGH IMPACT POLYSTYRENE

(75) Inventors: Doug Berti, Houston, TX (US); Aron Griffith, League City, TX (US); Jay Reimers, Houston, TX (US); Thanh Nguyen, Sugar Land, TX (US)

(73) Assignee: Fina Technology, Inc., Houston, TX (US)

( * ) Notice: Subject to any disclaimer, the term of this patent is extended or adjusted under 35 U.S.C. 154(b) by 338 days.

(21) Appl. No.: 11/384,737

(22) Filed: Mar. 20, 2006

(65) Prior Publication Data

US 2007/0142549 A1     Jun. 21, 2007

Related U.S. Application Data

(60) Provisional application No. 60/752,766, filed on Dec. 21, 2005.

(51) Int. Cl.
*C08F 2/02* (2006.01)
*B01J 19/24* (2006.01)

(52) U.S. Cl. .................... 525/53; 525/243; 525/316; 422/134

(58) Field of Classification Search .............. 525/53, 525/243, 316; 422/134
See application file for complete search history.

(56) References Cited

U.S. PATENT DOCUMENTS

| | | | | |
|---|---|---|---|---|
| 3,144,420 A | * | 8/1964 | Fryling | 525/193 |
| 3,903,202 A | | 9/1975 | Carter et al. | |
| 4,777,210 A | * | 10/1988 | Sosa et al. | 525/53 |
| 5,414,045 A | * | 5/1995 | Sue et al. | 525/86 |
| 5,747,593 A | * | 5/1998 | Nozawa et al. | 525/193 |
| 5,942,575 A | * | 8/1999 | Monti et al. | 525/52 |

OTHER PUBLICATIONS

Patent application entitled "Reactor Apparatus Having Reduced Back Mixing," filed May 4, 2005, as U.S. Appl. No. 11/121,795.
Provisional patent application entitled "Horizontal Boiling Plug Flow Reactor and Reactor System for the Production of High Impact Polystyrene," filed Dec. 21, 2005, as U.S. Appl. No. 60/752,766.
Patent application entitled "Horizontal Boiling Plug Flow Reactor," filed Mar. 20, 2006, as U.S. Appl. No. 11/384,596.
"ATOFINA HIPS (high impact polystyrene)," Amco Plastic Materials, Inc., http://www.amco.ws/plastics/atofina/hips.asp, Jul. 7, 2005, pp. 1-2.

* cited by examiner

*Primary Examiner*—Fred M Teskin
(74) *Attorney, Agent, or Firm*—Tenley R. Krueger

(57) ABSTRACT

A continuous process for producing high impact polystyrene comprising feeding at least one vinyl aromatic monomer, an elastomer, and a free radical initiator to a first linear flow reactor to form a reaction mixture, polymerizing the reaction mixture in said linear flow reactor to at least the phase inversion point of the mixture, and feeding the reaction mixture from the first linear flow reactor to a second reactor for post-inversion polymerization of the mixture. A method of producing an elastomer-reinforced polymer comprising inverting a reaction mixture comprising at least one vinyl aromatic monomer, an elastomer, and a free radical initiator in a plug flow reactor. A high impact polystyrene reactor system, comprising a linear flow reactor having an inlet and an outlet, and a continuously stirred tank reactor having an inlet in fluid communication with the linear flow reactor outlet and receiving an effluent from the linear flow reactor.

3 Claims, 2 Drawing Sheets

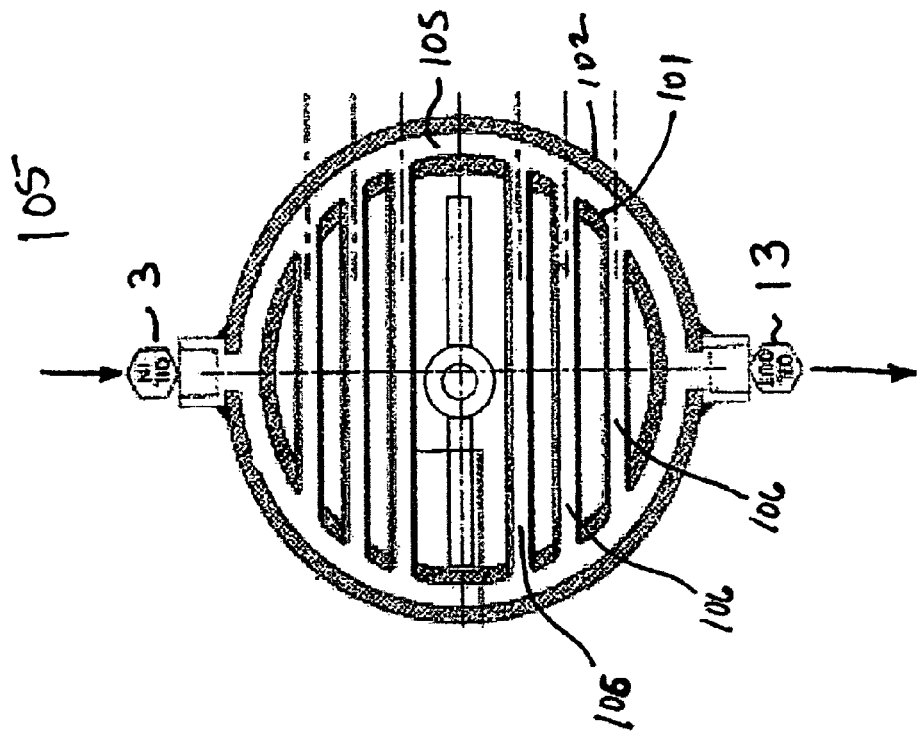
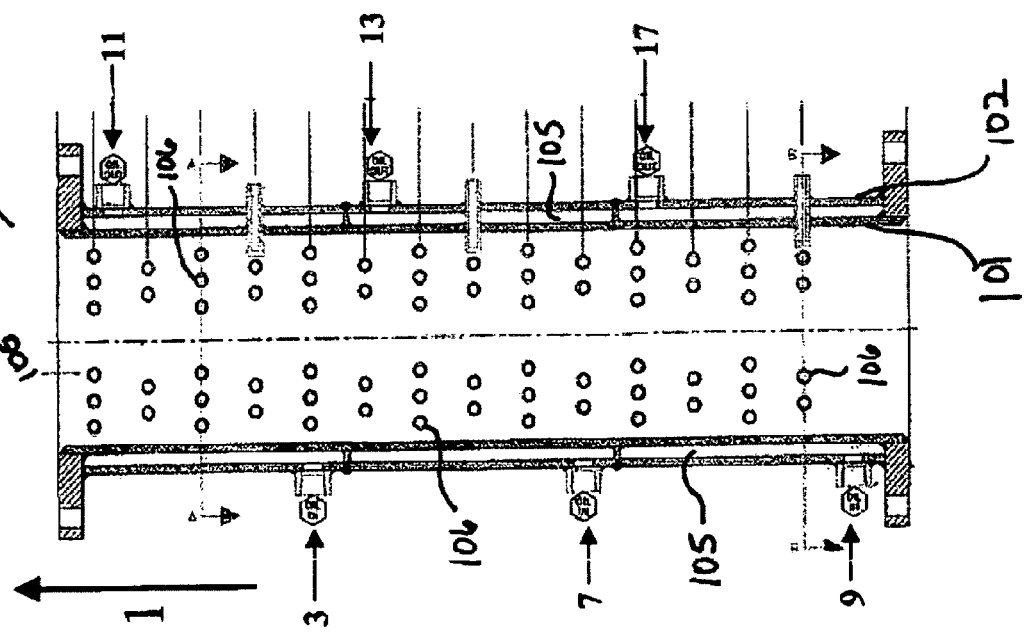

REACTOR SYSTEM FOR THE PRODUCTION OF HIGH IMPACT POLYSTYRENE

CROSS-REFERENCE TO RELATED APPLICATIONS

The present application claims priority to U.S. Provisional Application No. 60/752,766 filed Dec. 21, 2005 and entitled "Horizontal Boiling Plug Flow Reactor and Reactor System for the Production of High Impact Polystyrene," which is incorporated by reference. The present application relates to commonly owned U.S. patent application Ser. No. 11/121,795 filed May 4, 2005 and entitled "Reactor Apparatus Having Reduced Back Mixing" and U.S. patent application Ser. No. 11/384,596 filed concurrently herewith and entitled "Horizontal Boiling Plug Flow Reactor," both of which are incorporated by reference herein.

STATEMENT REGARDING FEDERALLY SPONSORED RESEARCH OR DEVELOPMENT

Not applicable.

FIELD OF THE INVENTION

The present invention relates generally to polymer synthesis and more particularly to the synthesis of high impact polystyrene using a combination of continuously stirred tank reactors and plug flow reactors.

BACKGROUND OF THE INVENTION

Elastomer-reinforced polymers of monovinylidene aromatic compounds such as styrene, alpha-methylstyrene and ring-substituted styrene have found widespread commercial use. For example, elastomer-reinforced styrene polymers having discrete elastomer particles such as cross-linked rubber dispersed throughout the styrene polymer matrix can be useful for a range of applications including food packaging, office supplies, point-of-purchase signs and displays, housewares and consumer goods, building insulation and cosmetics packaging. Such elastomer-reinforced polymers are commonly referred to as high impact polystyrene (HIPS).

Methods for the production of polymers, such as HIPS, typically employ polymerization using a continuous flow process. Continuous flow processes may involve a plurality of serially arranged reaction vessels wherein the degree of polymerization increases from one vessel to the next. Factors such as the arrangement of the reaction vessels and the reaction conditions influence the characteristics of HIPS produced. Different grades of HIPS may have differing elastomer content and extents of polymerization within each reactor resulting in differing mechanical and/or optical properties.

Key costs for the production of HIPS are associated with the type of continuous flow process used and the amount of elastomer utilized. Thus it would be desirable to develop an apparatus and methodology for the production of HIPS having a reduced elastomer content with enhanced mechanical properties.

BRIEF SUMMARY OF SOME OF THE PREFERRED EMBODIMENTS

Disclosed herein is a continuous process for producing high impact polystyrene comprising feeding at least one vinyl aromatic monomer, an elastomer, and a free radical initiator to a first linear flow reactor to form a reaction mixture, polymerizing the reaction mixture in said linear flow reactor to at least the phase inversion point of the mixture, and feeding the reaction mixture from the first linear flow reactor to a second reactor for post-inversion polymerization of the mixture.

Further disclosed herein is a method of producing a elastomer-reinforced polymer comprising inverting a reaction mixture comprising at least one vinyl aromatic monomer, an elastomer, and a free radical initiator in a plug flow reactor.

Further disclosed herein is a high impact polystyrene reactor system, comprising a linear flow reactor having an inlet for receiving at least one vinyl aromatic monomer, an elastomer, and a free radical initiator and an outlet for conveying a reactor effluent, and a continuously stirred tank reactor having an inlet in fluid communication with the linear flow reactor outlet and receiving the effluent from the linear flow reactor.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 2a is a diagram of a linear flow reactor.

FIG. 2b is a cross-sectional view of an internal reactor cooling component.

DETAILED DESCRIPTION OF THE PREFERRED EMBODIMENTS

Figure 1:
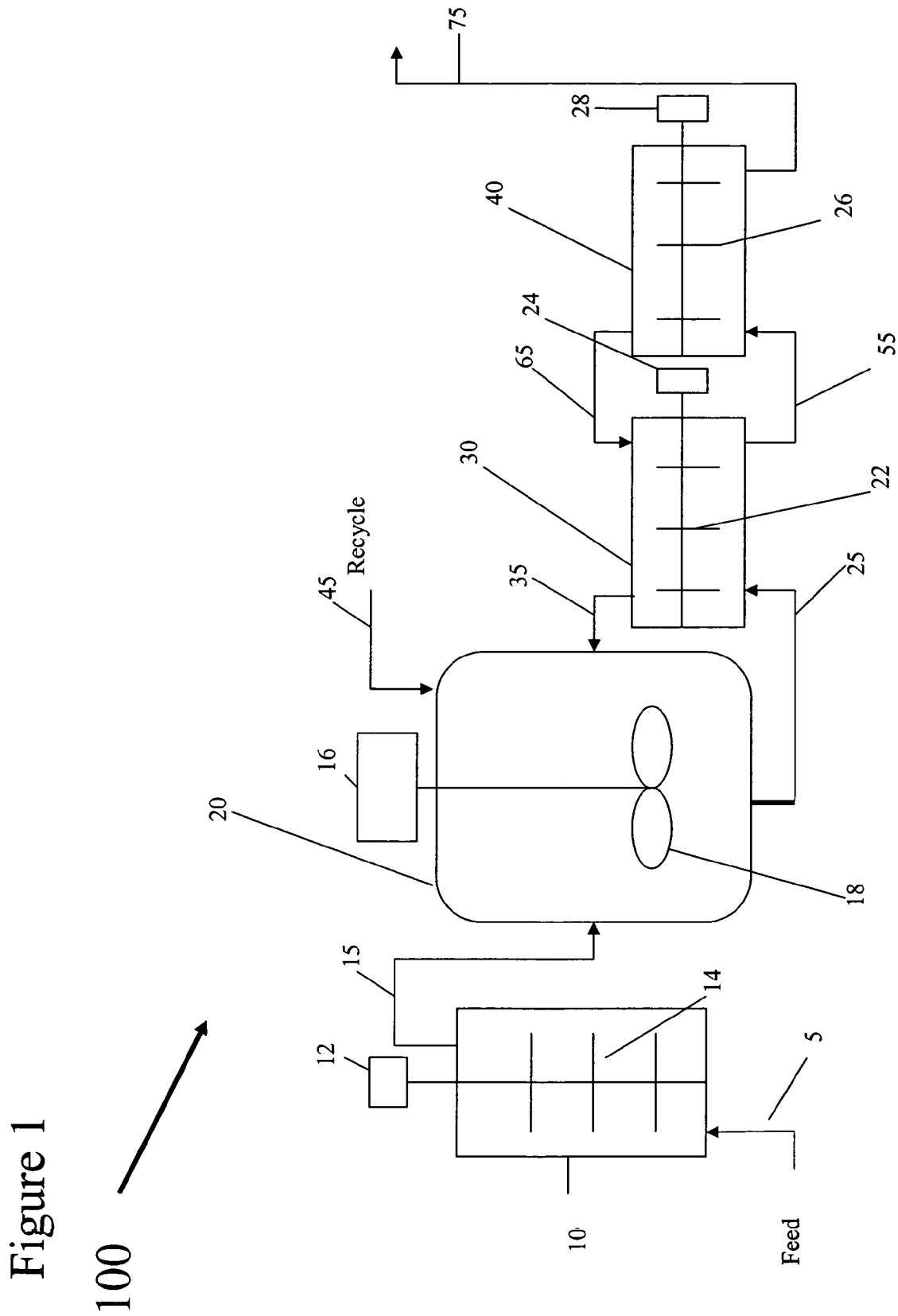
FIG. 1 is a schematic representation of an apparatus for HIPS production.

A schematic representation of a reactor system 100 for the continuous production of a elastomer-reinforced polymer is given in FIG. 1. In an embodiment, reactor system 100 is useful for a continuous HIPS production process. Referring to FIG. 1, a reaction mixture comprising styrene, an elastomer such as polybutadiene rubber, and a free radical initiator may be fed to a polymerization reactor 10, through a feed line generally indicated at 5. Alternatively, the reaction mixture comprises styrene, an elastomer such as polybutadiene rubber, a chain transfer agent and additional components such as those known in the art for the production of HIPS. Alternatively, the reaction mixture comprises styrene, an elastomer such as polybutadiene rubber, a combination of a free radical initiator and chain transfer agent and additional components such as those known in the art for the production of HIPS. The nature and amount of free radical initiator, chain transfer agent and additional components for the production of HIPS may be included as known to one of ordinary skill in the art. Such a feed line may allow for introduction of the reaction mixture through the bottom of the reactor, as shown in FIG. 1, alternatively such a feed line may allow for introduction of the reaction mixture through the top of the reactor, alternatively through any position along the reactor vessel that is compatible with the reaction mixture and the reactor equipment.

In an embodiment, a reaction mixture for introduction to the PFR may comprise from about 75% to about 99% styrene, from about 1% to about 15% polybutadiene, from about 0.001% to about 0.2% free radical initiator and additional components as needed to impart the desired physical properties. The percent values given are percentages by weight of the total composition. As used herein the term styrene includes a variety of substituted styrenes (e.g., alpha-methyl styrene), ring-substituted styrenes such as p-methylstyrene as well as unsubstituted styrenes.

The polymerization reactor 10 may be a linear-flow reactor, such as a plug flow reactor (PFR) shown in more detail in FIG. 2a. In an embodiment, the polymerization reactor 10 is arranged vertically as shown in FIG. 1. In an alternative embodiment, the polymerization reactor 10 is arranged horizontally in the apparatus.

Polymerization reactor 10 may be operated under conditions that allow the polymerization reaction to proceed to at least the point of phase inversion before the reaction mixture is introduced to any additional polymerization reactors. As such polymerization reactor 10 is termed a plug flow inversion reactor (PFIR). Stated alternatively, the reactants in polymerization reactor 10 undergo phase inversion prior to exiting the reactor, referred to here after as PFIR 10.

Phase inversion refers to a morphological transformation that occurs during the preparation of HIPS. In an embodiment, HIPS preparation involves the dissolution of polybutadiene rubber in styrene that is subsequently polymerized. During polymerization, a phase separation based on the immiscibility of polystyrene and polybutadiene occurs in two stages. Initially, a mixture of styrene and polybutadiene forms the major or continuous phase with a mixture of polystyrene and styrene dispersed therein. However, as the reaction of styrene into polystyrene progresses and the amount of polystyrene increases, a morphological transformation or phase inversion occurs such that the polystyrene/styrene mixture forms the continuous phase. This phase inversion leads to the formation of complex rubbery particles in which the rubber exists in the form of membranes surrounding occluded domains of polystyrene.

Referring again to FIG. 1, the PFIR 10 may contain agitators 14 driven by a motor 12. Such agitators may promote radial dispersion of the reactants but are not intended to provide axial mixing so as to minimize backmixing in the reactor. A similar linear flow reactor design has been disclosed in U.S. patent application Ser. No. 11/384,596 filed concurrently herewith entitled "Horizontal Boiling Plug Flow Reactor," which is incorporated by reference herein.

As polymerization reactions are highly exothermic, means are required to control the temperature in the reaction vessel as the polymerization proceeds. In an embodiment, shown in FIG. 2a, heat is removed through internal cooling coils in the PFIR 10. FIG. 2b is a cross-sectional view of an internal cooling coil taken along line A-A in FIG. 2a. In FIG. 2a, arrow 1 indicates the reaction process flow in the PFIR, which is an upward flow of reactants in a vertical reactor, as shown in FIG. 1, but with the further understanding that reactor orientation and flow direction can vary as discussed previously. The PFIR 10 may be a dual wall reactor having an inner wall 101 and outer wall 102. Outer flow channels 105 are disposed between the inner and outer walls such that a coolant, such as thermal oil, may be introduced to the PFIR 10 at inlet ports to the internal cooling coils shown as 3, 7 and 9. The coolant may then circulate throughout the reactor cooling coils and exit the system through the outlet ports 11, 13 and 17. Inner flow channels 106 of the cooling coil may traverse the breadth of the reactor and connect the outer flow channels 105. Coolant flowing through the internal cooling coils functions as a heat exchanger that enables the removal of excess heat from the polymerization reaction.

Referring again to FIG. 1, the apparatus may further comprise an additional polymerization reactor, 20, located downstream of polymerization reactor 10. Output from polymerization reactor 10 may be fed to polymerization reactor 20 via line 15. In an embodiment, polymerization reactor 20 is a continuously stirred tank reactor (CSTR) having an agitator 18 driven by a motor 16.

The polymerization of styrene to polystyrene may continue with the output from polymerization reactor 20 being fed to additional polymerization reactors, 30 and 40, via lines 25 and 55, respectively. In an embodiment, reactors 30 and 40 may be linear-flow reactors, such as a plug flow reactors, that may also be equipped with agitators 22 and 26 driven by motors 24 and 28, respectively. In the embodiment shown in FIG. 1, the two linear flow reactors 30 and 40 are horizontally oriented and serially connected to polymerization reactor 20 with increased polymerization occurring in each subsequent reactor. In an embodiment, reactor system 100 may comprise any number of additional reactors downstream of reactor 20 (e.g., CSTR 20) as desired by the user. The number, orientation (e.g., horizontal or vertical), and connectivity (e.g., serial or parallel) of the linear flow reactors may be determined by one skilled in the art based on requirements such as production capacity required or extent of product conversion desired. The resultant HIPS polymer and any other remaining compounds may be removed from the final reactor, e.g., reactor 40, via line 75, and thereafter the HIPS polymer may be recovered and optionally further processed, such as pelletized.

In an embodiment, unreacted styrene monomer and other volatile residual components may exit any of the reactors or downstream processing equipment (not shown) as a recycle stream. In general, a recycle stream may be recovered from any downstream reactor and returned to any one or more suitable upstream reactors. In the embodiment shown in FIG. 1, a recycle stream exiting a separation device downstream of reactor 40 may be returned upstream to polymerization reactor 20 at line 45. Alternatively, as shown in FIG. 1, a recycle stream exiting polymerization reactor 30 may be returned upstream to polymerization reactor 20 via line 35. Alternatively, as shown in FIG. 1, a recycle stream exiting polymerization reactor 40 may be returned upstream to polymerization reactor 30 via line 65. In an embodiment, the recycle stream undergoes recycle treatment designed to increase the purity of the recycle components, e.g., styrene, before being reintroduced to a reactor. Methods, conditions and apparatuses for carrying out recycle treatments are known to one of ordinary skill in the art.

In an embodiment, the HIPS produced by the disclosed apparatus and process configuration has a reduced rubber (e.g., polybutadiene rubber) content while having similar or enhanced mechanical and/or optical properties when compared to a HIPS produced using a conventional process configuration and apparatus. Conventional process configurations and apparatuses for the production of HIPS are known to one of ordinary skill in the art. For example, a conventional process configuration and apparatus may employ two CSTRs (i.e., reactors 10 and 20 in FIG. 1) as the first and second polymerization reactors prior to feeding the reaction mixture to some number of linear flow reactors (i.e., reactors 30 and 40 in FIG. 1). In an embodiment, the rubber content of the HIPS produced by the disclosed apparatus and process configuration is reduced by equal to or greater than about 5%, alternatively about 10%, but has similar or enhanced mechanical and/or optical properties when compared to HIPS produced by a conventional process configuration and apparatus. Hereafter, HIPS having a reduced rubber content will be denoted rHIPS while HIPS produced using a conventional process configuration and apparatus will be denoted nHIPS.

The rHIPS may display an impact strength similar to or improved in comparison to nHIPS when using standard tests of impact strength such as the Izod impact and falling dart test. Izod impact is defined as the kinetic energy needed to initiate a fracture in a specimen and continue the fracture until the specimen is broken. Tests of the Izod impact strength determine the resistance of a polymer sample to breakage by flexural shock as indicated by the energy expended from a pendulum type hammer in breaking a standard specimen in a single blow. The specimen is notched which serves to concentrate the stress and promotes a brittle rather than ductile fracture. Specifically, the Izod Impact test measures the amount of energy lost by the pendulum during the breakage of the test specimen. The energy lost by the pendulum is the sum of the energies required to initiate sample fracture, to propagate the fracture across the specimen, and any other energy loss associated with the measurement system (e.g., friction in the pendulum bearing, pendulum arm vibration, sample toss energy). In an embodiment, the rHIPS of this disclosure has an Izod impact strength of 1.5 ft.lb/inch to 3.5 ft.lb/inch, alternatively, 2 ft.lb/inch to 3 ft.lb/inch, alternatively 2.8 ft.lb/inch.

The falling dart impact test is also a standard test of polymer impact resistance. Specifically, it is the energy required to rupture a film. The test is conducted by determining the weight of a dart dropped from a height of 26 inches that causes 50% of the samples to break. In an embodiment, the rHIPS of this disclosure has a falling dart impact strength of 40 g to 200 g, alternatively, of greater than 100 g.

In an embodiment, the rHIPS may also display ductile properties such as bend or elongation similar to or improved in comparison to that of nHIPS. Ductile properties such as bend or elongation indicate the ability of a material to deform elastically until a fracture or break point. Specifically, the elongation of a polymer sample is typically given as the percent elongation, which refers to the length the polymer sample is after it is stretched (L), divided by the original length of the sample (L0), and then multiplied by 100. The bend of a polymer sample refers to the number of times a specimen constructed of the polymeric material may be bent before it fractures. In an embodiment the rHIPS of this disclosure has a bend of 10 to 150, alternatively, 20 to 90, alternatively, 70 and an elongation of 2% to 80%, alternatively, 40% to 70%, alternatively 70%.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

A high impact polystyrene was produced using a polymerization reactor configuration as disclosed herein and depicted in FIG. 1. The mechanical and optical properties of this high impact polystyrene material produced using the disclosed reactor system of FIG. 1 was compared to that of high impact polystyrene material produced by a standard apparatus and process configuration having the first two reactors as CSTRs (e.g., reactor 10 replaced with a CSTR in FIG. 1). The high impact polystyrene material produced by a standard apparatus and process configuration has typical properties as set forth in Table 1A and is a high impact strength resin that is suitable for applications such as custom sheet extrusion or thermoforming, printing surfaces and packaging.

TABLE 1A

|  | ASTM Test | Typical Value |
|---|---|---|
| Melt Flow | | |
| Flow, gm/10 min., 200/5.0 | D-1238 | 3.0 |
| Impact Properties | | |
| Falling Dart, in-lb | D-3029 | 125 |
| Izod, ft-lbs/in, notched | D-256 | 2.2 |
| Tensile Properties | | |
| Strength, psi | D-638 | 3,500 |
| Modulus, psi ($10^5$) | D-638 | 3 |
| Elongation, % | D-638 | 55 |
| Flexural Properties | | |
| Strength, psi | D-790 | 6,900 |
| Modulus, psi ($10^5$) | D-790 | 3.2 |
| Thermal Properties | | |
| Heat Distortion, °F. Annealed | D-648 | 201 |
| Vicat Softening, °F. | D-1525 | 210 |
| Optical Properties | | |
| Gloss, 60° | D-523 | 70 |

Four experimental trials were conducted using variations in reagents and/or process configurations of the reactor system of FIG. 1. In Trial 1, a standard HIPS-type reactant feed, given in Table 1B, was introduced to the PFIR and reacted to produce HIPS. TAKTENE 380/550are butadiene rubbers commercially available from Lanxess.

Trial 2 was similar to Trial 1 with the exception that a different free radical initiator was used and the rubber type was all TAKTENE 550. Low rubber conditions, 6% and 5.5%, were also run in this trial. Trial 3 had similar reaction conditions to Trial 1 however the process was configured such that recycling of unreacted styrene and volatile monomers occurred at different reactors than in previous trials. Trial 4 was similar to Trial 3 however DIENE 70 rubber manufactured by Firestone was used in place of TAKTENE rubber and a low rubber condition, 5.5%, was also run in this trial.

TABLE 1B

| Trial | Rubber Type | Rubber % |
|---|---|---|
| 1 | 50% TAKTENE 380<br>50% TAKTENE 550 | 7 |

As shown in Table 2, the mechanical and optical properties of HIPS produced in Trials 1 through 4 were compared to the standard HIPS product (produced via the standard reactor configuration described previously) as determined in accordance with the appropriate ASTM method given in parentheses.

TABLE 2

| Physical Property | Standard 825E | Trial 1 | Trial 2 | Trial 3 | Trial 4 |
|---|---|---|---|---|---|
| Melt Flow Index (ASTM D 1238) | 2.8 | 2.6 | 3.1 | 3.5 | 2.9 |
| Gloss, 60 (%) (ASTM D 523) | 52 | ND** | 50 | 34 | 57 |
| Izod (ft.-lb/in) (ASTM D 256) | 2.6 | 3.5 | 3.0 | 2.9 | 2.8 |
| Falling Dart (in-lb) (ASTM D 3029) | 67 | 78 | 80 | 66 | 90 |
| Bends | 20 | 54 | 58 | 36 | 36 |
| % Elongation | 49 | 50 | 58 | 63 | 54 |
| RPS* (micron) | 5.4 | 3.9 | 3.7 | 4.7 | 3.4 |

*RPS = rubber particle size as determined by laser light scattering apparatus
**ND = not determined The results demonstrate that the HIPS produced in Trials 1 through 4 have better impact properties, as reflected in an improved Izod and falling dart impact strength than the standard HIPS. Furthermore, the HIPS produced in Trials 1 through 4 had improved ductile properties such as bend and elongation when compared to the standard HIPS.

Table 3 compares the physical properties of HIPS produced in Trials 2 and 4 under low rubber conditions. Samples from Trial 2 were run using either 5.5% or 6% rubber as indicated. The physical properties were determined in accordance with the appropriate ASTM method given in parentheses.

TABLE 3

| Physical Property | Standard 825E | Trial 2 | Trial 2 | Trial 4 |
|---|---|---|---|---|
| % Rubber | 7 | 5.5 | 6 | 5.5 |
| Melt Flow Index (ASTM D 1238) | 2.8 | 3.4 | 3.7 | 3.2 |
| Gloss, 60 (%) (ASTM D 523) | 52 | 57 | 54 | 56 |
| Izod (ft.-lb/in) (ASTM D 256) | 2.6 | 2.1 | 2.4 | 2.2 |
| Falling dart (in-lb) (ASTM D 3029) | 67 | 72 | 70 | 85 |
| Bends | 20 | 41 | 50 | 31 |
| % Elongation | 49 | 56 | 57 | 56 |
| RPS (micron) | 5.4 | 4.7 | 5.0 | 3.9 |

The results demonstrate that the 6% rubber HIPS in Trial 2 comes the closest to matching the Izod of the standard HIPS. In this case, Izod was only slightly worse and would still be considered as acceptable. However, even at 5.5% rubber, all impact and ductile properties beside Izod for the HIPS produced in Trials 2 and 4 are superior to the standard HIPS.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A continuous process for producing high impact polystyrene comprising: feeding at least one vinyl aromatic monomer, an elastomer, and a free radical initiator to a first linear flow reactor to form a reaction mixture; polymerizing the reaction mixture in said linear flow reactor to at least the phase inversion point of the mixture; and feeding the reaction mixture from the first linear flow reactor to a second reactor for post-inversion polymerization of the mixture, wherein the second reactor is a continuously stirred tank reactor.

2. A continuous process for producing high impact polystyrene comprising: feeding at least one vinyl aromatic monomer, an elastomer, and a free radical initiator to a first linear flow reactor to form a reaction mixture; polymerizing the reaction mixture in said linear flow reactor to at least the phase inversion point of the mixture; and feeding the reaction mixture from the first linear flow reactor to a second reactor for post-inversion polymerization of the mixture, wherein the reaction mixture is fed from the second reactor to one or more additional continuously stirred tank reactors for additional polymerization of the mixture.

3. A method of producing an elastomer-reinforced polymer comprising: inverting a reaction mixture comprising at least one vinyl aromatic monomer, an elastomer, and a free radical initiator in a plug flow reactor and feeding the post-inversion mixture to one or more additional reactors for continued polymerization, wherein a first additional reactor is a continuously stirred tank reactor.

* * * * *